(12) United States Patent
Kratz et al.

(10) Patent No.: US 12,081,643 B2
(45) Date of Patent: *Sep. 3, 2024

(54) METHODS FOR NANOSECOND-SCALE TIME SYNCHRONIZATION OVER A NETWORK

(71) Applicant: ZaiNar, Inc., Redwood City, CA (US)

(72) Inventors: Philip A. Kratz, Redwood City, CA (US); Mainak Chowdhury, Redwood City, CA (US); Alexander Hooshmand, Redwood City, CA (US); Daniel M. Jacker, Redwood City, CA (US)

(73) Assignee: ZaiNar, Inc., Redwood City, CA (US)

( * ) Notice: Subject to any disclaimer, the term of this patent is extended or adjusted under 35 U.S.C. 154(b) by 247 days.

This patent is subject to a terminal disclaimer.

(21) Appl. No.: 17/590,621

(22) Filed: Feb. 1, 2022

(65) Prior Publication Data

US 2022/0158816 A1    May 19, 2022

Related U.S. Application Data

(63) Continuation of application No. 17/025,635, filed on Sep. 18, 2020, now Pat. No. 11,271,713, which is a
(Continued)

(51) Int. Cl.
*H04L 7/00* (2006.01)
*H04L 7/04* (2006.01)
(Continued)

(52) U.S. Cl.
CPC ............. *H04L 7/08* (2013.01); *H04L 7/0016* (2013.01); *H04L 7/041* (2013.01); *H04W 64/003* (2013.01)

(58) Field of Classification Search
CPC ... H04L 7/00; H04L 7/042; H04L 7/08; H04L 7/0016; G01S 7/4008; G01S 5/0284;
(Continued)

(56) References Cited

U.S. PATENT DOCUMENTS

| 10,903,866 B1 | 1/2021 | Kratz et al. |
| 10,903,915 B1 | 1/2021 | Kratz et al. |

(Continued)

OTHER PUBLICATIONS

International Search Report and Written Opinion from International Application No. PCT/US22/25828, 10 pages.
Non-Final Office Action for U.S. Appl. No. 17/338,543 dated May 12, 2022.
(Continued)

*Primary Examiner* — Khai Tran
(74) *Attorney, Agent, or Firm* — Run8 Patent Group, LLC; Peter Miller

(57) ABSTRACT

A method includes, at a first node: transmitting a first synchronization signal at a first time according to a first clock of the first node; back-coupling the first synchronization signal to generate a first self-receive signal; calculating a time-of-arrival of the first self-receive signal according to the first clock; and calculating a time-of-arrival of the second synchronization signal according to the first clock. The method also includes, at the second node: transmitting the second synchronization signal at a second time according to a second clock of the second node; back-coupling the second synchronization signal to generate a second self-receive signal; calculating a time-of-arrival of the second self-receive signal according to the second clock; and calculating a time-of-arrival of the first synchronization signal according to the second clock. The method S100 further includes calculating a time bias and a propagation delay between the pair of nodes based on the time-of-arrivals.

20 Claims, 8 Drawing Sheets

Related U.S. Application Data continuation of application No. 16/405,922, filed on May 7, 2019, now Pat. No. 10,833,840.

(60) Provisional application No. 62/734,978, filed on Sep. 21, 2018, provisional application No. 62/668,219, filed on May 7, 2018.

(51) Int. Cl.
*H04L 7/08* (2006.01)
*H04W 64/00* (2009.01)

(58) Field of Classification Search
CPC .......... G01S 5/14; G01S 11/08; G01S 5/0273; H04W 64/00; H04W 24/00; H04W 4/023; H04B 1/7183; H04B 10/118
USPC ........................................................ 375/368
See application file for complete search history.

(56) References Cited

U.S. PATENT DOCUMENTS

| | | |
|---|---|---|
| 2006/0215583 A1 | 9/2006 | Castagnoli |
| 2009/0232113 A1 | 9/2009 | Tamaki |
| 2013/0022079 A1* | 1/2013 | Villien ................. H04B 1/7183 |
| | | 375/E1.001 |
| 2013/0322426 A1 | 12/2013 | Niranjayan et al. |
| 2014/0295881 A1* | 10/2014 | Werner ................. G01S 5/0236 |
| | | 455/456.1 |
| 2015/0295702 A1 | 10/2015 | Ogawa |
| 2016/0099700 A1 | 4/2016 | Tavakol et al. |
| 2016/0291124 A1* | 10/2016 | Bauer ................... G01S 5/0221 |
| 2019/0113595 A1 | 4/2019 | Tomioka |
| 2021/0006389 A1 | 1/2021 | Kratz et al. |
| 2021/0243713 A1 | 8/2021 | Ellenbeck et al. |

OTHER PUBLICATIONS

Non-Final Office Action from U.S. Appl. No. 16/862,080 dated May 6, 2022.

* cited by examiner

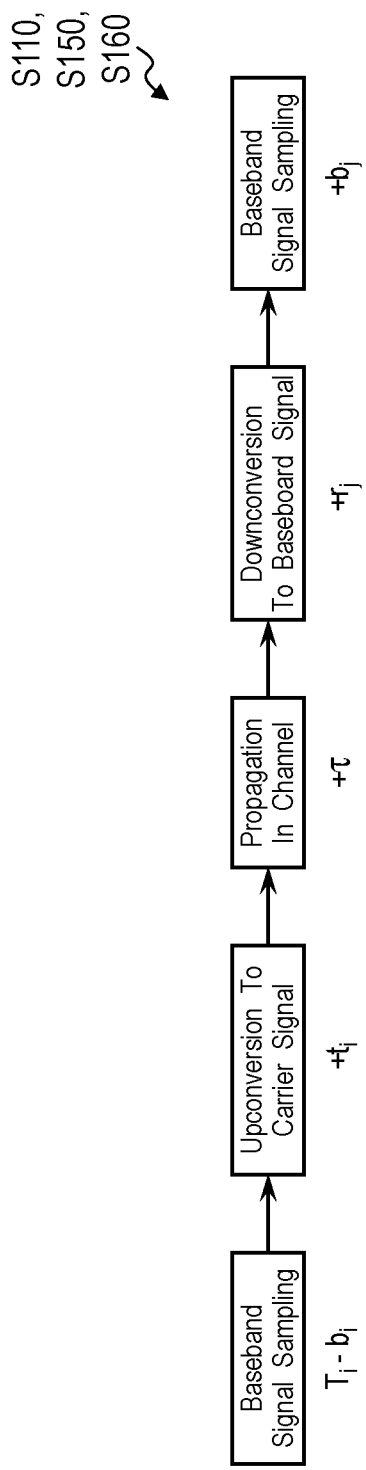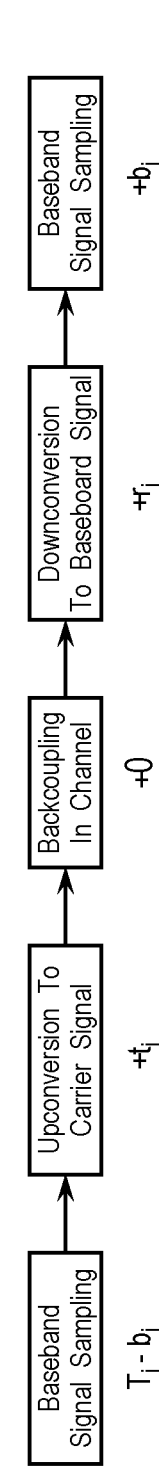
FIG. 5A
FIG. 5B

METHODS FOR NANOSECOND-SCALE TIME SYNCHRONIZATION OVER A NETWORK

CROSS-REFERENCE TO RELATED APPLICATIONS

This Application is a continuation application of U.S. patent application Ser. No. 17/025,635, filed on 18 Sep. 2020, which is a continuation application of U.S. patent application Ser. No. 16/405,922, filed on 7 May 2019, which claims the benefit of U.S. Provisional Application No. 62/668,219, filed on 7 May 2018, and U.S. Provisional Application No. 62/734,978, filed on 21 Sep. 2018, each of which is incorporated in its entirety by this reference.

TECHNICAL FIELD

This invention relates generally to the field of networking and digital communication and more specifically to a new and useful method for network time synchronization in the field of networking and digital communication.

BRIEF DESCRIPTION OF THE FIGURES

FIG. 5A is a flowchart representation of transmission and reception of a synchronization signal;
and
FIG. 5B is a flowchart representation of transmission and reception of a self-receive signal.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Methods

Figure 1A:
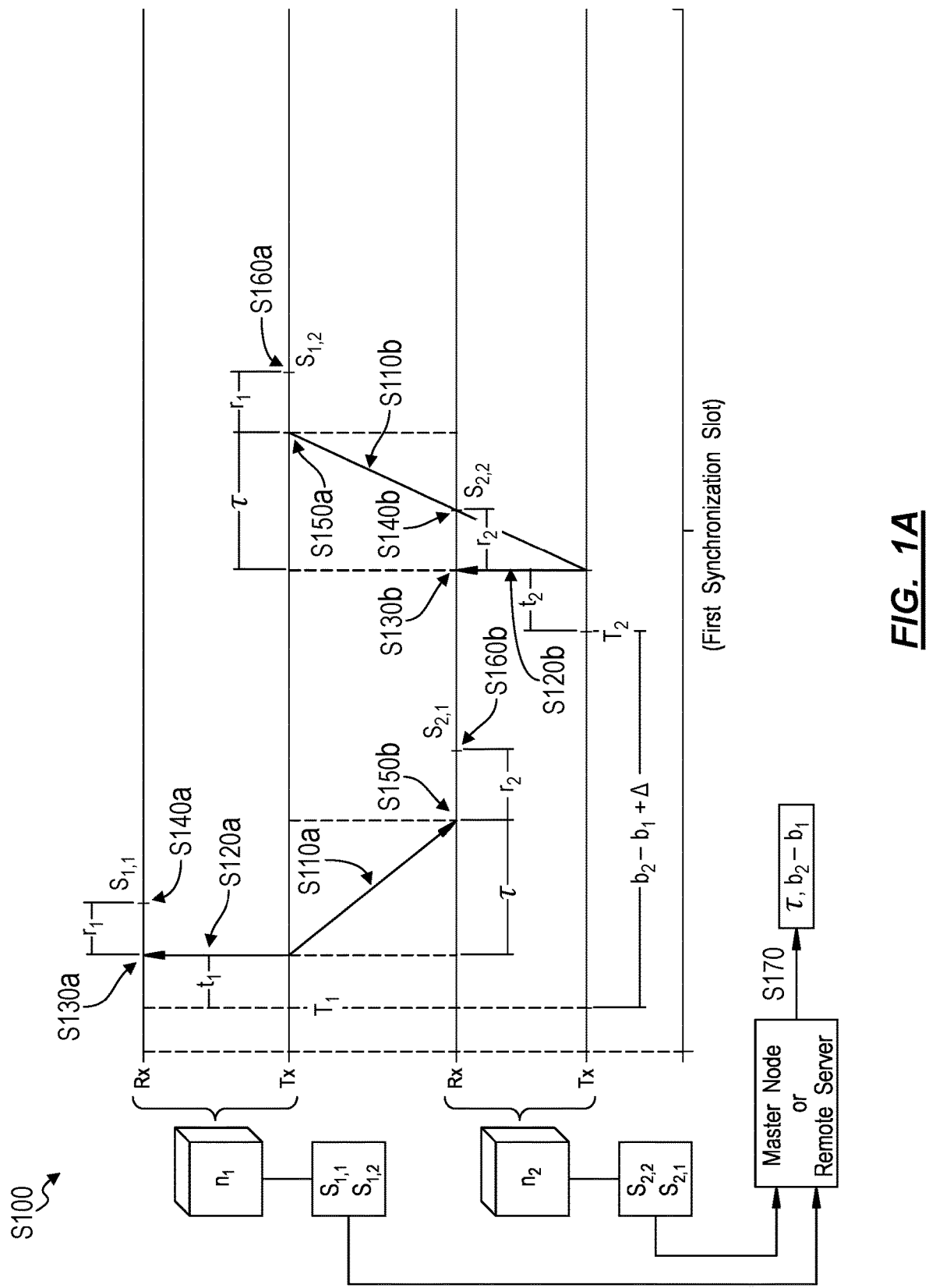
FIG. 1A is a flowchart representation of a method.

As shown in FIG. 1A, a method S100 for characterizing time bias and propagation delay between a pair of nodes includes, at a first node in the pair of nodes and during a first synchronization slot: transmitting a first synchronization signal at a first time according to a first clock of the first node in Block S110A; back-coupling the first synchronization signal to generate a first self-receive signal in Block S120A; receiving the first self-receive signal in Block S130A; calculating a time-of-arrival of the first self-receive signal according to the first clock in Block S140A; receiving a second synchronization signal from the second node in Block S150A; and calculating a time-of-arrival of the second synchronization signal according to the first clock in Block S160A. The method S100 also includes, at the second node and during the first synchronization slot: transmitting the second synchronization signal at a second time according to a second clock of the second node in Block S110B; back-coupling the second synchronization signal to generate a second self-receive signal in Block S120B; receiving the second self-receive signal in Block S130B; calculating a time-of-arrival of the second self-receive signal according to the second clock in Block S140B; receiving the first synchronization signal from the first node in Block S150B; and calculating a time-of-arrival of the first synchronization signal according to the second clock in Block S160B. The method S100 further includes calculating a time bias and a propagation delay between the pair of nodes based on the time-of-arrival of the first self-receive signal and the time-of-arrival of the second synchronization signal, the time-of-arrival of the second self-receive signal and the time-of-arrival of the first synchronization signal at the second node in Block S170.

Figure 1B:
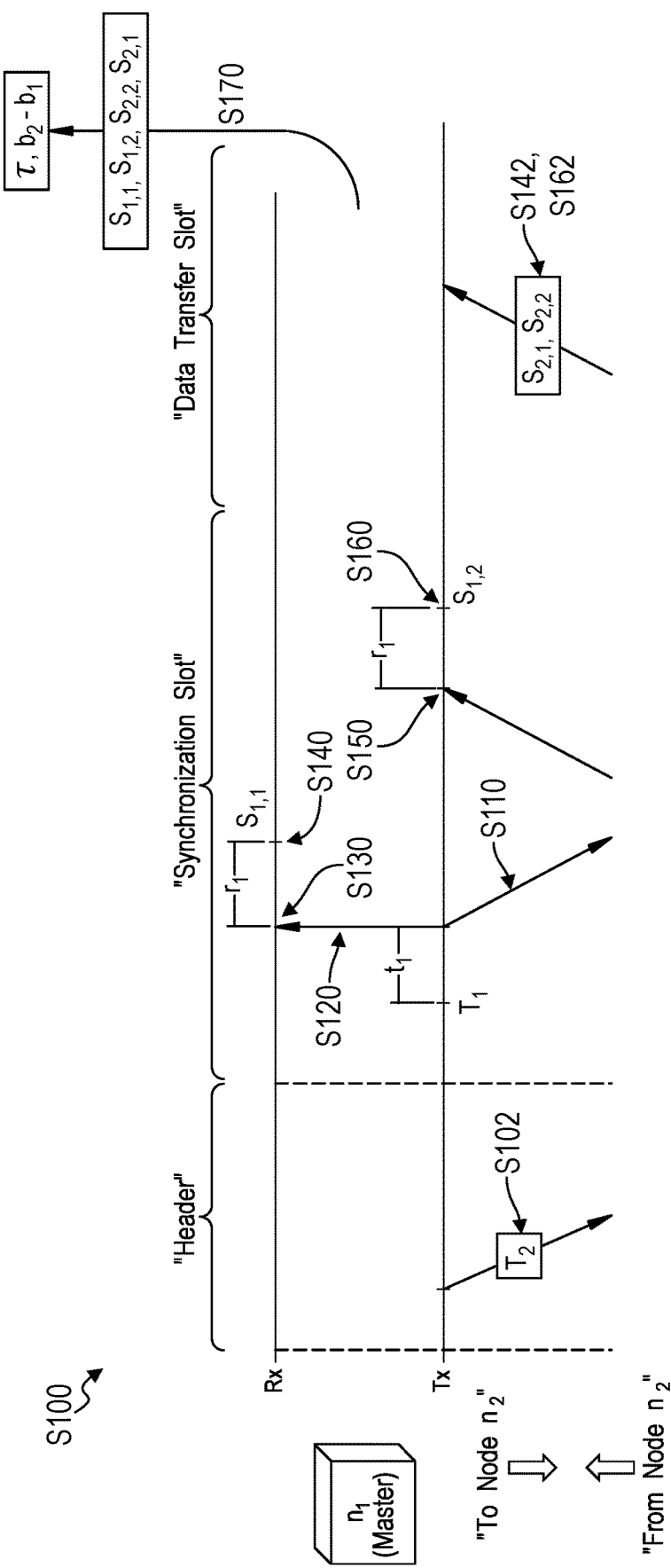
FIG. 1B is a flowchart representation of a first variation of the method.

As shown in FIG. 1B, a first variation of the method S100 includes: transmitting a coordination signal to a second node in the pair of nodes, the coordination signal indicating a second time to transmit a second synchronization signal in Block S102; transmitting a first synchronization signal at a first time according to a first clock of the first node in Block S110; back-coupling the first synchronization signal to generate a first self-receive signal in Block S120; receiving the first self-receive signal in Block S130; calculating a time-of-arrival of the first self-receive signal according to the first clock in Block S140; receiving the second synchronization signal, the second synchronization signal transmitted by the second node at the second time according to a second clock of the second node in Block S150; calculating a time-of-arrival of the second synchronization signal according to the first clock in Block S160; receiving a time-of-arrival of a second self-receive signal from the second node, the second self-receive signal back-coupled by the second node upon transmission of the second synchronization signal, the time-of-arrival of the second self-receive signal calculated according to the second clock in Block S142; receiving a time-of-arrival of the first synchronization signal from the second node, the time-of-arrival of the first synchronization signal calculated by the second node according to the second clock in Block S162; and calculating a first time bias between the first clock and the second clock and a first propagation delay between the first node and the second node based on the time-of-arrival of the first self-receive signal, the time-of-arrival of the first synchronization signal, the time-of-arrival of the second self-receive signal, and the time-of-arrival of the second synchronization signal in Block S170.

Figure 1C:
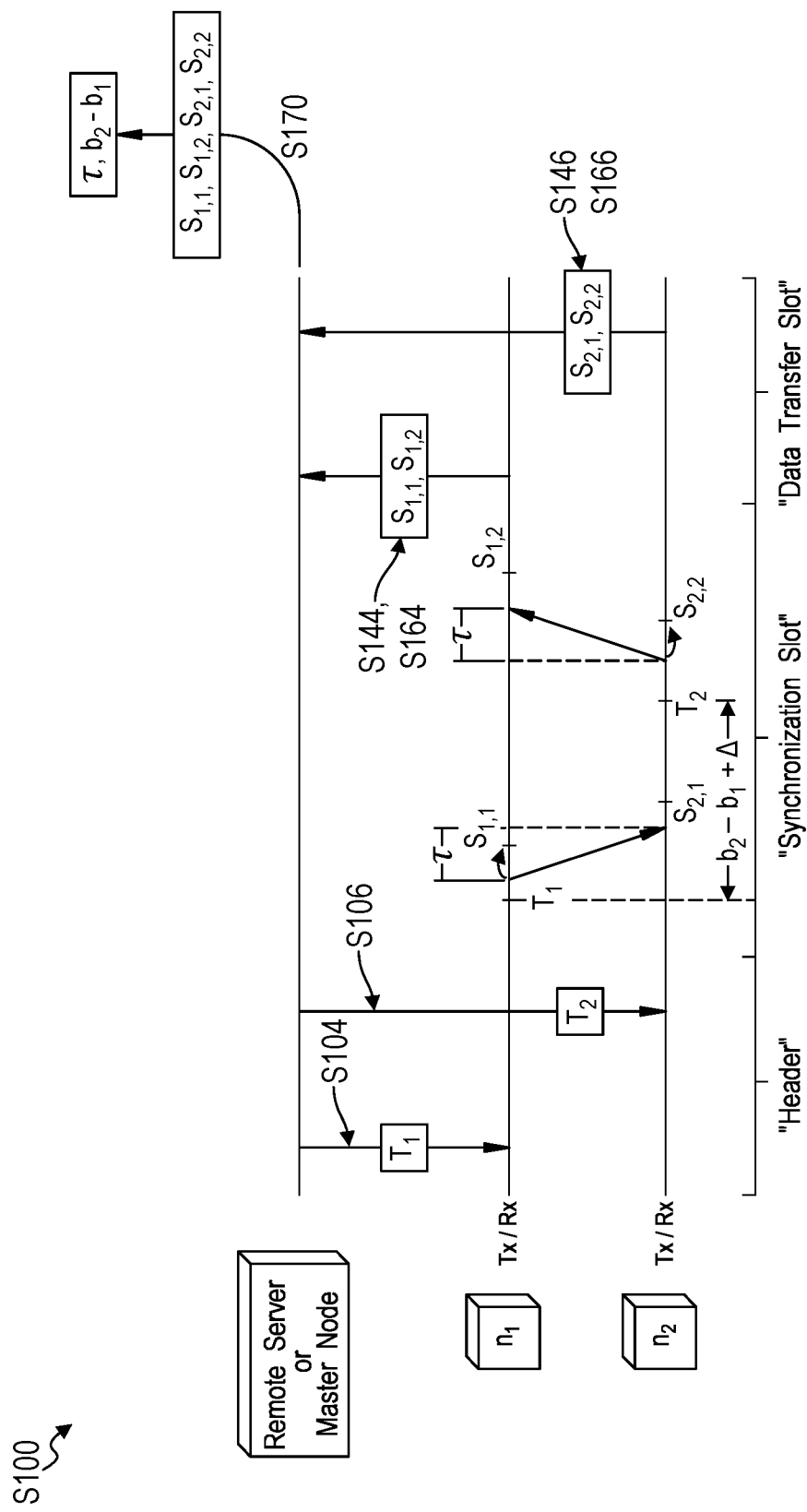
FIG. 1C is a flowchart representation of a second variation of the method.

As shown in FIG. 1C, a second variation of the method S100 includes scheduling transmission of a first synchronization signal at a first time by a first node in Block S104; and scheduling transmission of a second synchronization signal at a second time by a second node in Block S106. The second variation of the method S100 also includes, after transmission of the first synchronization signal by the first node at the first time according to a first clock of the first node: receiving, from the first node, a time-of-arrival of a first self-receive signal according to the first clock, wherein the first self-receive signal is a back-coupled version of the first synchronization signal in Block S144; and receiving, from the second node, a time-of-arrival of the first synchronization signal according to a second clock of the second node in Block S164. The second variation of the method S100 further includes, after transmission of the second synchronization signal by the second node at the second time according to the second clock: receiving, from the second node, a time-of-arrival of a second self-receive signal according to the second clock, wherein the second self-receive signal is a back-coupled version of the second synchronization signal in Block S146; and receiving, from the first node, a time-of-arrival of the second synchronization signal according to the first clock in Block S166. The second variation of the method S100 also includes calculating a first time bias between the first clock and the second clock and a first propagation delay between the first node and the second node based on the time-of-arrival of the first self-receive signal, the time-of-arrival of the first synchronization signal, the time-of-arrival of the second self-receive signal, and the time-of-arrival of the second synchronization signal in Block S170.

A third variation of the method S100 includes: predicting a drift magnitude of the time bias between the first node and the second node between the first synchronization slot and the second synchronization slot based on a predictive drift model in Block S180; and setting a duration of the second synchronization slot equal to a sum of the maximum time bias uncertainty, the maximum accumulated drift magnitude over the duration of the first synchronization signal, the propagation delay, and a duration of the first synchronization signal in Block S190.

2. Applications

Generally, the method S100 is executed by a pair of node devices (hereinafter "nodes") in a network and/or remote servers in order to synchronize—such as to within one nanosecond—the clocks of the pair of nodes. The method S100 can calculate the time bias between clocks to within one nanosecond or with sub-nanosecond precision without prior information regarding the position of the two nodes (or even a requirement for the nodes to be stationary), without precise calibration of the hardware of either node, and with each node using standard electronic clock technology, such as a crystal oscillator clock. Additionally, the method S100 can utilize a frequency bandwidth of less than five megahertz. The small bandwidth of the method S100 enables transmission of frequency bands with high propagation range and/or penetration. Examples of such bands include frequency bands for cellular communications or public safety uses (e.g., the 902-928 MHz ISM band or sub-GHz cellular band). Thus, the method S100 enables applications such as time-synchronized distributed antenna systems, which can further enable precise localization of RF emitting devices, remote sensing of public safety infrastructure, and improvements in time-based data transfer protocols.

More specifically, the method S100 for synchronizing time between two nodes can be categorized as a two-way ranging and synchronization protocol. However, the method S100 is distinguished from other two-way ranging protocols in that each node transmits independently of other nodes at an absolute time (according to the clock of each node), as opposed to transmitting in response to receiving signals from a master node in the pair. Furthermore, each node is configured to execute a scheme to provide a local reference copy of the transmitted signal, within the transceiver hardware of the node, in order to provide a "time-of-departure" for each transmitted synchronization signal (via a back-coupling and/or reflection of a transmitted synchronization signal). The time-of-arrival of this reflected and/or back-coupled version of a transmitted synchronization signal (hereinafter a "self-receive signal") includes the transmit and receive chain delays that would be incurred by a signal transmitted by another node, thereby enabling direct comparison of the time-of-arrival of various signals without precise characterization of these delays.

Blocks of the method S100 can be executed by a system, which can include a pair of node devices (i.e. nodes) in a mesh network, a master node and a slave node in a mesh network, and/or a remote server coordinating with a pair of nodes in a mesh network. Each node in the mesh network can include networking hardware, such as an antenna, transceiver hardware, an FPGA/DPS, a clock, and self-receive hardware (e.g. directional couplers, RF power splitters, combiners, circulators, etc.) further described below. However, the method S100 can also be performed between nodes in a wired network. The nodes in the mesh network are mutually connected to the internet or to a local area network such that the initial time bias between any pair of nodes in the mesh network is initially limited by the network time protocol (hereinafter "NTP"), or any other network time synchronization protocol. This time bias can range from tens of milliseconds to microseconds in many state-of-the-art networks.

Nodes in the mesh network communicate with each other using time division multiple access (hereinafter "TDMA") and/or code division multiple access (hereinafter "CDMA"), thereby minimizing frequency bandwidth usage. Thus, the nodes can execute Blocks of the method S100 during one or more synchronization slots within a TDMA frame structure. In one implementation, synchronization slot duration and frame length are dynamically adjustable. In particular, the method S100 can leverage smaller initial time biases between a pair of nodes to decrease synchronization slot duration and further reduce uncertainty in the time bias calculation. Furthermore, the frame structure can include data transfer frames enabling the nodes to communicate with each other or with a remote server via the internet protocol suite in order to execute blocks of the method S100. For example, nodes can transfer a set of time-of-arrivals to a remote server for further processing according to the method S100.

Assuming an initial coarse clock synchronization between a pair of nodes (e.g. one to ten milliseconds), each of the pair of nodes transmits a synchronization signal to the other node at the beginning of the synchronization slot according to each node's clock. However, due to the relative time bias between each of the nodes, these synchronization signals are sent at times offset by the time bias between the two nodes. The synchronization signal is a frequency modulated, amplitude modulated, or phase modulated pseudorandom code or a combination of multiple codes (e.g., on multiple center carrier frequencies). Upon receiving the synchronization signal from the other node in the pair of nodes each node calculates a time-of-arrival (hereinafter "TOA"), such as by using the magnitude, time offset, and carrier phase of the autocorrelation peaks associated with one or more codes.

Figure 3A:
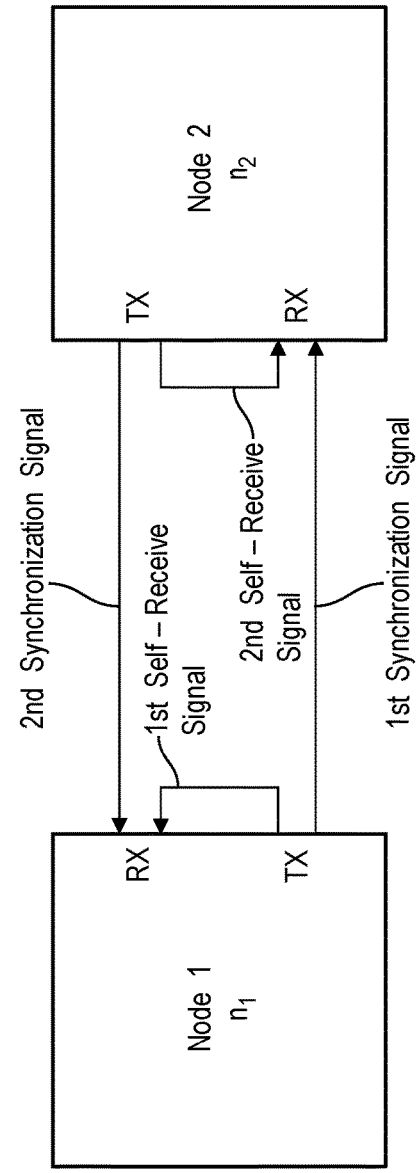
FIG. 3A is a schematic representation of a pair of nodes in the mesh network.

Upon sending the synchronization signal, each node includes self-receive hardware (shown in FIG. 3C) that back-couples and/or internally reflects a portion of the synchronization signal, thereby generating a self-receive signal, as shown in FIG. 3A. The self-receive hardware reflects and/or back-couples an attenuated repetition of the outgoing synchronization signal, which is then received by the same node that transmitted the synchronization signal. Each node then calculates a TOA for the self-receive signal after it has passed through the same receiver chain as an incoming signal would. Thus, the TOA of the self-receive signal acts as a time-of-departure of the synchronization signal offset by the receiver delay time of the transmitting node. The method S100 includes generating the self-receive signal such that the TOA of an incoming synchronization signal from another node can be directly compared to a time of departure of an outgoing node without the need for precise measurement and/or calibration of the receiver delay.

Each node in the pair then receives the synchronization signal from the other node and calculates a TOA for the synchronization signal. Therefore, by the end of the synchronization slot, each node has recorded a TOA for a self-receive signal and for a synchronization signal of the other node. These TOAs are then transmitted to one of the nodes or to a remote server to solve a system of two equations for two unknowns: the relative time bias between the pair of nodes (including receiver delay) and the propagation delay (i.e. transmission time) between the pair of nodes. This system of equations is solvable based on the reciprocity theorem of electromagnetism. The relative time bias between clocks of the two nodes can then be calculated and tracked by a master node or a remote server coordinating the mesh network. Alternatively, the relative time bias between nodes can then be reported to both nodes and one node (i.e. a slave node) can then synchronize its clock to match the other (i.e. a master node).

Although the first synchronization between the two node clocks according to the method S100 may be highly accurate, greater accuracy and reduced TDMA overhead is achieved through slot refinement, wherein the synchronization slot duration is reduced based on the smaller time bias between the two clocks. Therefore, in each successive synchronization slot for the pair of nodes the synchronization slot duration is decreased, thereby reducing sources of error such as accumulated jitter and/or environmental frequency drift that may occur during the synchronization process. For example, a typical quartz crystal oscillator may be expected to have a drift of six ppm which corresponds to six nanoseconds of drift during a millisecond duration synchronization slot. If the synchronization slot duration is instead reduced to 100 microseconds, the expected drift is reduced to less than one nanosecond.

By executing synchronization slot refinement techniques the system can also increase the duration of time within a frame for data transmission thereby improving data transfer rates for the nodes. Additionally, with a shorter synchronization slot duration, the method S100 can be performed at a higher rate of repetition thereby improving synchronization during changing environmental conditions.

After synchronization has occurred between a pair of nodes in the mesh network, the method S100 can be executed on a pairwise basis with other nodes in the mesh network in successive synchronization slots, thereby distributing time across the entire mesh network.

In some implementations, the method S100 leverages repetitive synchronization between two nodes and pairwise synchronization between multiple nodes in the network, in combination with environmental data recorded from inertial measurement units (hereinafter "IMUs") or temperature sensors within each node, to create a predictive drift model for each node in the mesh network. The predictive drift model can characterize the time drift of a node as a function of measured environmental input data over time. The method S100 can also include triggering a synchronization slot in the next frame or altering the length of the synchronization slot based on the output of the predictive drift model. Alternatively, the method S100 can include adjusting a node's clock between synchronization slots.

3. Examples

The method S100 for synchronizing time between two node devices has wide ranging benefits including: more precise and flexible localization using a time synchronized mesh network of nodes; and improvements to time or frequency-based communication protocols.

In one example application of the method S100, a mesh network of nodes can perform the method S100 on a pairwise basis to synchronize their clocks across the mesh network. Each of the nodes in the mesh network can then individually calculate a TOA of a signal from an RF emitting source not included in the mesh network. By comparing TOAs between the nodes in the mesh network and performing multilateration, the location of the RF emitting source can be calculated to a degree of precision limited by temporal synchronization between nodes. For example, with temporal synchronization within one nanosecond, the location of an RF emitting source can be calculated to within 30 centimeters relative to the nodes in the mesh network. If one node in the mesh network acts as an anchor node and is calibrated with accurate global positional information, the absolute position of the RF emitting source can also be detected.

In one example application of mesh network-based localization, nodes are distributed throughout an area, within buildings, or even on cars driving on the streets of an urban area. The nodes execute Blocks of the method S100 to periodically synchronize their clocks and then collect TOA data for other RF emitting sources within the mesh area. The remote server coordinating with the nodes can subsequently transform these TOA data into three-dimensional geospatial locations of the RF emitting sources, thereby improving location services, asset tracking, and object detection. Thus, the remote server or master node can: calculate a relative location of nodes in the network based on the propagation delay between the nodes; receive, from several nodes in the mesh network, a time-of-arrival of a signal from a transmitting device; and calculate, via multilateration, a relative location estimate for the transmitting device accounting for the relative time bias between each of the nodes in the mesh network.

In another example, TDMA based protocols may be limited to slot durations of a few tens of milliseconds. Therefore, Blocks of the method S100 can be executed to synchronize clocks of devices within a wired or wireless network in order to more accurately calculate the time bias, enabling a reduction in dead time and interference between slots while improving bitrate and bandwidth due to reduced inefficiencies in the multiple access protocol.

4. Node Hardware

Figure 3B:
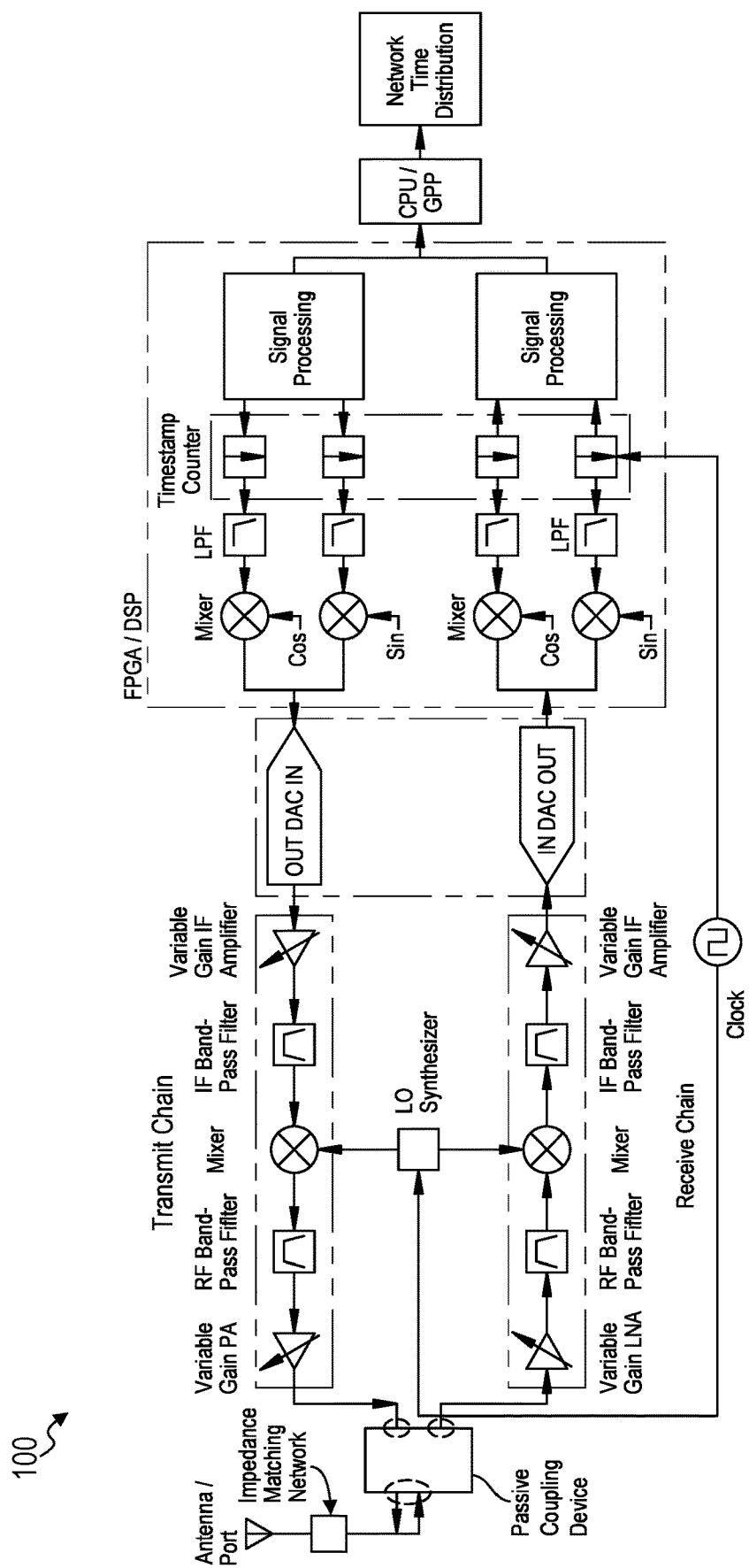
FIG. 3B is a schematic representation of a node in the mesh network.
Figure 3C:
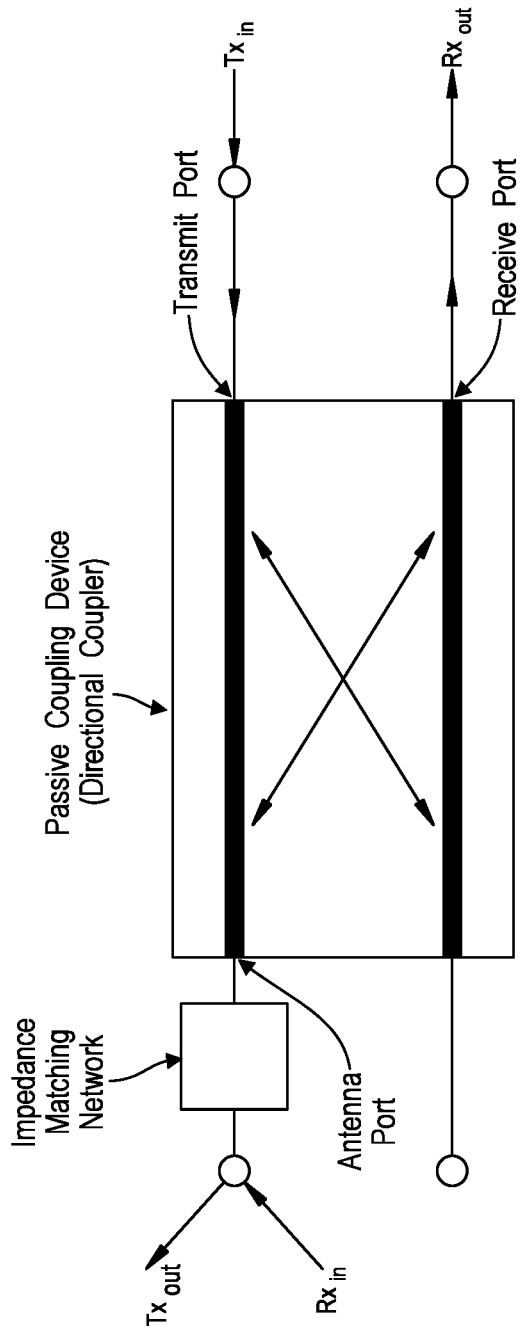
FIG. 3C is a schematic representation of self-receive hardware of a node.

As discussed above, the method S100 is executed by or via coordination with nodes in a network. Examples of hardware for wireless nodes are shown in FIGS. 3B and 3C. Generally, nodes include transmission components and receiver components, an FPGA or DSP configured to generate and process signals, a clock, and self-receive signal hardware.

In one implementation, the nodes transmit information wirelessly and as such include RF transceiver hardware such as a super heterodyne radio architecture and an Rx/Tx antenna shown in FIG. 3B. In this implementation, each node includes a "receive chain" and a "transmit chain." The receive chain includes a pipeline of hardware components that process signals received from the Rx port. The transmit chain includes a pipeline of hardware components that process transmission signals generated by the FPGA or DSP and feed them into the Tx port. The receive chain and the transmit chain impart a "receive chain delay" and a "transmit chain delay" respectively. "Receive chain delay" and "transmit chain delay" describe the amount of time elapsed as a signal traverses either the receive chain or the transmit chain respectively.

In an alternate implementation, the nodes can communicate over a wired network. In this implementation, the nodes can include an I/O port and/or appropriate interface converters for communicating over any wired medium (e.g. ethernet, fiber optic, etc.) instead of an antenna. These interface converters can also impart a receive chain and transmit chain delays upon transmitted and received signals.

In one implementation, a node includes extant transceiver infrastructure such as cell tower, mobile phone, or any other RF transceiving device that has been adapted to execute the method S100. A cell tower or other extant transceiver can be adapted to execute the method S100 via software means. In alternate implementations, the nodes can include optimized hardware to improve the performance of the method S100, which can include impedance-matching networks at an antenna interface between a passive coupling device (e.g., coupling the transmit chain and the receive chain to the antenna).

In wireless node implementations, the FPGA or DSP of each node is configured to generate complex digital signals and output the generated signals to a DAC. The complex components of the digital signals represent the in-phase and quadrature portions (i.e. I/Q) of the analog signal to be generated by the DAC. Additionally, the FPGA or DSP of the node receives digital signals from the antenna of the node via an ADC and timestamps received synchronization signals according to an instant value of its own clock and a TOA calculation process further described below.

Each node includes a clock, such as a crystal oscillator clock or an atomic clock, which may be responsible for time-keeping functions at the node. The method S100 can be executed to synchronize the clocks of multiple nodes within a network. In particular, the method S100 can effectively synchronize crystal oscillator clocks that satisfy basic frequency stability, phase noise, and frequency requirements for wireless communication. In one example, the clock is a quartz crystal oscillator with an AT cut and a clock frequency of ten megahertz. However, a node can include a crystal oscillator of any frequency or cut assuming the aforementioned constraints are met.

Each node can include specific self-receive hardware, which back-couples and/or reflects a self-receive signal in Block S120. Generally, upon a node transmitting a synchronization signal, the self-receive hardware reflects and/or back-couples an attenuated repetition of the synchronization signal back to the receiving port of the transmitting node. By processing the transmitted synchronization signal via the receive chain and calculating a TOA for the self-receive signal, each node is able to timestamp transmitted signals delayed by the receive chain delay. When the node later receives a synchronization signal from another node, the TOA of the synchronization signal also incurs the same receive chain delay. Because the TOA of the self-receive signal and the TOA of the synchronization signal both include the receive chain delay they can be directly compared without precise calibration of the receive chain hardware.

In one implementation, the self-receive hardware includes an impedance mismatched directional coupler shown in FIG. 3C. The self-receive hardware can also include a variable impedance circuit, which may be software controlled to vary the gain of the reflected Tx signal into the Rx port. Depending on the specific hardware implementation of the node, similar impedance-matching can be applied to circulators, power splitters, or any other transmission line device, as further described below. In one implementation, a node can include standard antenna interface hardware with unintentionally mismatched antenna impedance (e.g., characterized by a voltage standing wave ratio greater than one), which can function as the self-receive hardware by reflecting synchronization signals at the antenna interface. Thus, each node need not include specialized self-receive hardware in order to execute the method S100.

The self-receive hardware defines a tuned reflection coefficient for signals incident to the interface between a passive coupling device and the antenna of the node, by including an impedance-matching network between the antenna and the passive coupling device. The impedance-matching network transforms the impedance of the antenna to an impedance that effects a precise reflection coefficient between the passive coupling device and the antenna. The reflection coefficient is selected such that the reflected power of the self-reflected signal is above the noise floor of the ADC and below the saturation voltage of the ADC.

In another implementation, the matching network can maintain the reflection coefficient for a wide range of signal frequencies. For example, the self-receive hardware can include a switchable wideband matching network to improve the consistency of the reflection coefficient across a wide range of transmit frequencies. In this example, the self-receive hardware can actively switch between multiple impedance-matching networks depending on the frequency of the signal being transmitted by the node.

In yet another implementation, the self-receive hardware can include a frequency multiplexer connected to multiple impedance-matching networks such that each distinct impedance-matching network encounters signals at a frequency that results in the precise reflection coefficient.

In an additional implementation, the system 100 can include an adaptive impedance-matching network that can adjust its impedance and therefore the reflection coefficient between the passive coupling device and the antenna. The node can then use the adaptive impedance-matching network to adjust the reflection coefficient ensuring reception of the self-reflected signal despite changes in the noise levels at the ADC due to changing gains in RF transmit chain and/or receive chain amplifiers and/or interfering signals in the frequency band or bands of interest.

In one implementation, the self-receive hardware includes a directional coupler as the passive coupling device. The directional coupler includes four ports, two for each of the coupled transmission lines. In this implementation, the transmit port and the antenna port are located on the same transmission line in the directional coupler while the receive port is located at the coupled port opposite the antenna, thereby receiving coupled power from the antenna and reflected power from the interface between the directional coupler and the antenna. Alternatively, the self-receive hardware can include a directional coupler wherein the receive port and the antenna port are located on the same transmission line. As a result, the receive port receives direct power from the antenna port and the reflected power from the antenna port. However, in this alternative implementation, the antenna port receives signals from the transmit port at a lower power due to coupling between the two transmission lines. Thus, a higher power at the transmit port results in the same power at the antenna port. However, in an implementation wherein the receive port and the antenna port are coupled to the same transmission line, the self-receive hardware can improve the sensitivity of the transceiver to signals received at the antenna.

In an alternative implementation, the self-receive hardware includes a power divider as the passive coupling device. The power divider divides power from an input port between two output ports. In this implementation, power input at the antenna port is split between the transmit port and the receive port, thus any power reflected at the interface between the antenna and the power divider is also divided between the transmit port and the receive port.

In yet another implementation, the self-receive hardware includes a circulator as the passive coupling device. The circulator can couple the transmit port directly to the antenna port while the antenna port is directly coupled to the receive port. Any reflections generated at the antenna port interface are then coupled back to the receive port.

In one implementation, each node can include a software-defined radio architecture performing the function of any of the hardware elements described above.

However, the self-receive hardware can include any software or hardware system for feeding a Tx signal into an Rx port of a node.

5. Gross Time Synchronization

Prior to execution of the method S100, the clocks of each node are coarsely synchronized using another time synchronization protocol. For example, the pair of nodes may be connected to the internet and in communication with one or more NTP servers. Thus, both node clocks may be synchronized to between one and ten milliseconds under some conditions. Alternatively, the nodes can communicate with a global navigation system (hereinafter "GNSS") time synchronization server and may be synchronized to within one microsecond in some cases.

The method S100 leverages existing time synchronization protocols, such that the nodes are able to communicate with the same synchronization slot in a TDMA described below.

Thus, a remote server can: coarsely synchronize a first node's clock and a second node's clock; schedule transmission of a first synchronization signal within a first synchronization slot of a first frame, the first synchronization slot characterized by a first synchronization slot duration; schedule transmission of a second synchronization signal within a second synchronization slot of the first frame, the second synchronization slot characterized by the first synchronization slot duration; configure the second node to receive the first synchronization signal during the first synchronization slot of the first frame; and configure the first node to receive the second synchronization signal during the second synchronization slot of the first frame.

6. Slot and Frame Definition

Figure 4A:
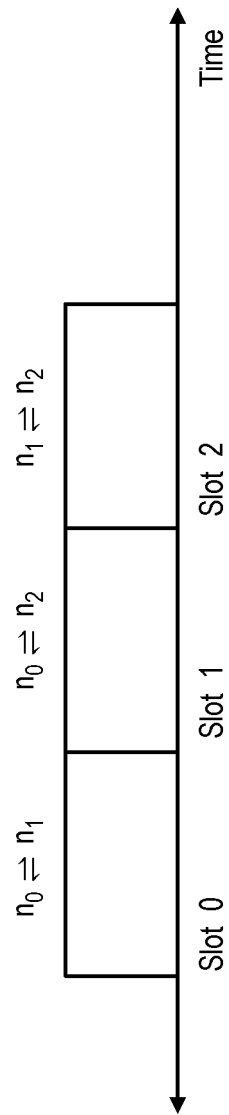
FIGS. 4A and 4B are schematic representations of synchronization slot structures.
Figure 4B:
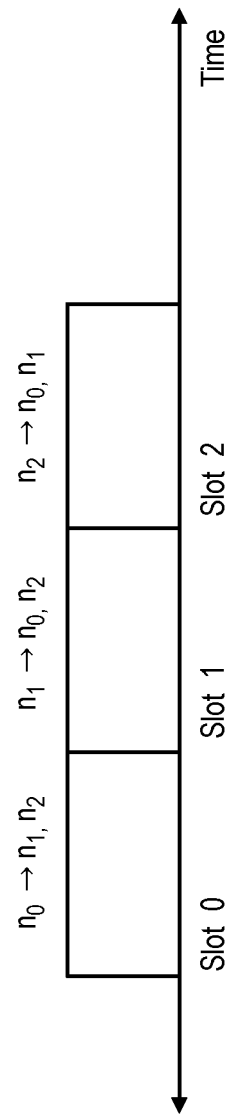

Generally, in the method S100, communication between a pair of nodes occurs according to a slot and frame TDMA structure; examples of which are shown in FIGS. 4A and 4B.

The TDMA structure can include one or more slots for both time synchronization via the method S100 and data transfer. In one implementation, shown in FIG. 4A, each TDMA frame includes a synchronization slot to synchronize each unique pair of nodes in the mesh network. For example, a mesh network including three nodes, $n_1$, $n_2$, and $n_3$, would include a first synchronization slot for the synchronization of $n_1$ and $n_2$; a second synchronization slot for $n_1$ and $n_3$; and a third synchronization slot for $n_2$ and $n_3$. Alternatively, as shown in FIG. 4B, the TDMA frame can include a synchronization slot for each node in the mesh network to transmit a synchronization signal to all other nodes in the mesh network. For example, in a mesh network including three nodes, $n_1$, $n_2$, and $n_3$, would include a first synchronization slot for $n_1$ to transmit a synchronization signal to $n_2$ and $n_3$; a second synchronization slot for $n_2$ to transmit a synchronization signal to $n_1$ and $n_3$; and a third synchronization slot for $n_3$ to transmit a synchronization signal to $n_1$ and $n_2$.

In one implementation, (e.g., if the initial synchronization accuracy achieved with NTP is sufficiently low), each synchronization slot is further divided into two subsequent sub-slots to reduce synchronization overhead. For example, in a synchronization for $n_1$ and $n_2$, $n_1$ transmits during the first sub-slot and $n_2$ receives the transmission from $n_1$. Then, in a second sub-slot, $n_2$ transmits and $n_1$ receives.

Each TDMA frame can also include a header indicating the presence and order of synchronization slots and data transfer slots for each node in the mesh network. In one implementation, each TDMA frame includes a set of synchronization slots. Alternatively, each TDMA frame may or may not include a set of synchronization slots according to the header for the TDMA frame. In yet another implementation, a TDMA frame can include multiple sets of synchronization slots. In one implementation, the header can include a coordination signal transmitted by a remote server or master node coordinating the TDMA protocol in order to communicate specific transmission times for synchronization signals to nodes in the mesh network.

The duration of synchronization slots and the buffer time between two synchronization slots corresponding to different pairs of nodes can vary depending on the implementation and factors such as the current known time bias between nodes and associated uncertainty. The method S100 can include adjusting synchronization slot duration based on the output of a predictive drift model, further described below. Furthermore, the synchronization slot duration can have a lower limit equal to a sum of the uncertainty in the time bias between the pair of nodes, the propagation time between the pair of nodes, the uncertainty of the propagation time between the pair of nodes, and the duration of the synchronization signal, of which the duration of the synchronization signal is typically the most significant factor. In one implementation the slot and the buffer between synchronization slots are both set to one millisecond. Additionally or alternatively, the method S100 can include adjusting the synchronization slot duration as a function of the signal-to-noise ratio of previously received synchronization signals in order to provide additional measurement acquisition time to determine TOA of signals with lower signal-to-noise ratios.

Additionally, the duration of each TDMA frame is subject to a set of practical constraints. The TDMA frame duration can have an upper limit defined by the expected drift of the least stable node clock in the node pair compared to the desired accuracy of the clock synchronization process. For example, if one node clock is known to drift one nanosecond per second due to accumulated jitter and the desired accuracy of the clock synchronization process is one nanosecond, the TDMA frame duration (or time between synchronization slots) would be limited at one second such that the time bias between nodes is not likely to exceed one nanosecond.

Furthermore, the TDMA frame duration has a lower limit based on the sum of the expected initial clock offset between the nodes, the total duration of the synchronization slots, the total duration of any data transfer slots, and the total duration of any time buffers between slots. The frame duration must be sufficiently long for each node to receive the initial synchronization signal from each of the other nodes in the network while accounting for a large initial time bias. Thus, if the nodes are initially synchronized using NTP, the frame duration should be at least tens of milliseconds to account for time biases that are typical between NTP synchronized clocks.

In one implementation, during initial synchronization of a set of nodes in a mesh network. The set of nodes are configured (e.g., by the remote server) to broadcast a coordination signal at a predetermined time according to the clock of each node. Given initial coarse time synchronization between nodes, the system can designate a master node as the first node to transmit a coordination signal to the other nodes. Each node in the mesh network can then confirm receipt of the master node's confirmation signal, thereby designating it as the master node. Thus, a first node in a pair of nodes can receive, from a second node in the pair of nodes, a confirmation of receipt of the coordination signal; and, in response to receiving confirmation of receipt of the coordination signal before the first node receives a second coordination signal from another node in the mesh network, designating the first node as a master node.

In an alternative implementation, the TOA of the coordination signal can be calculated at each node and sent to a remote server, which can then determine the master node in the mesh network. In yet another alternative implementation, the remote server designates the master node or coordinates the TDMA and the method S100 for the set of nodes in the mesh network.

When communicating within a TDMA synchronization slot, each node in a pair of nodes executing the method S100 can transmit synchronization signals and receive both synchronization signals from other nodes and self-receive signals during the synchronization slot. Therefore, in one implementation, the nodes execute a time division duplex (hereinafter "TDD") or a half-duplex scheme to communicate within a synchronization slot. In this implementation, the synchronization signals transmitted by each node in a node pair are separated by a predetermined delay time (e.g., approximately half the synchronization slot duration) such that a first node in a pair of nodes can transmit a first synchronization signal and receive a self-receive signal corresponding to the first synchronization signal during a first division of the synchronization slot and subsequently receive a second synchronization signal (transmitted from a second node in the node pair) in a second division of the synchronization slot. In this implementation, nodes executing the method S100 can transmit a coordination signal including timing information such as slot division durations and timings to other nodes in the mesh network thereby establishing a half-duplex communication link between the two nodes.

In one implementation, the system can implement a full-duplex (i.e. frequency division duplex, hereinafter "FDD") communication scheme whereby each node in a pair of nodes can transmit and receive synchronization signals simultaneously (e.g., wherein each synchronization signal is sent over multiple frequencies). Additionally, each node in a pair of nodes can be configured to simultaneously receive a self-receive signal back-coupled to the receiver of the node and a synchronization signal from a second node in the pair of nodes.

Therefore, in one implementation, a master node in a pair of nodes can transmit the coordination signal to the second node, wherein the coordination signal indicates a second time to transmit the second synchronization signal equal to a first time of transmission of the first synchronization signal; and establish a full-duplex communication link with the second node.

However, in applications wherein a larger bandwidth is available, the nodes can also communicate using frequency division multiple access or any other channel access method.

7. Time Bias and Propagation Delay Characterization

As shown in FIG. 1A, each node in a pair of nodes can execute Blocks S110, S120, S130, S140, S150, and S160 to: transmit synchronization signals to each other at a predetermined transmission time that is evaluated according to the clock of each node; back-couple the synchronization signal via the self-receive hardware of the node to form a self-receive signal; and record TOAs for the back-coupled self-receive signal and the synchronization signal received from the opposite node in the pair of nodes. Thus, each node in a pair of nodes calculates two TOAs according to the node's clock. Each node can then send the TOA of the self-receive signal and the TOA of the synchronization signal (e.g., during a data transfer slot in the frame) either to one of the nodes in the pair of nodes or a remote server in order to calculate the time bias between the pair of nodes and the propagation delay between the pair of nodes, in Block S170.

Variations of the method S100 shown in FIGS. 1B and 1C include additional Blocks for coordinating a pair of nodes executing the method S100. In the first variation shown in FIG. 1B, a master node in the pair of nodes executes Blocks S102, S142, S162, and S170 in addition to the previously mentioned Blocks of the method S100 in order to: communicate a transmission time to the slave node; receive a TOA of the self-receive signal calculated by the slave node; receive a TOA of the synchronization signal calculated by the slave node; and calculate, at the master node, a time bias and a propagation delay between the master node and the slave node. Thus, the master node can communicate a transmission time to the slave node such that the master node can receive the synchronization signal transmitted by the slave node during a synchronization slot in the TDMA communication scheme.

In the second variation of the method S100 shown in FIG. 1C, a remote server or other computational device communicating with a pair of nodes executes Blocks of the method S104, S106, S144, S146, S164, S166, and S170 to: schedule a transmission time for each of the pair of nodes; receive TOAs from each of the nodes for a synchronization signal received by each of the pair of nodes, and a self-receive signal received at each of the pair of nodes; and calculate a time bias and a propagation delay between the pair of nodes.

Therefore, in any of the abovementioned variations, various entities included with the system can cooperate to execute a time synchronization protocol between a pair of nodes in a mesh network in order to calculate a time bias and a propagation delay between the pair of nodes. In one implementation, the time biases are tracked by a remote server and accounted for when managing a TDMA communication protocol, when executing multilateration for transmitting RF devices, or when executing any other protocol utilizing a time synchronized mesh network. Alternatively, one of the nodes can function as a master node and track time biases and propagation time between nodes in the mesh network.

In order to synchronize clocks of the pair of nodes relative to each other, each node in the node pair can concurrently or consecutively execute Blocks S110, S120, S130, S140, S150, and S160. For example, a first node in the pair of nodes can execute a first instance of these Blocks of the method S100 in S110A, S120A, S130A, S140A, S150A, and S160A, while a second node in the pair of nodes can execute a second instance of these Blocks in S110B, S120B, S130B, S140B, S150B, and S160B. For the purpose of clarity, description with reference to Blocks S110, S120, S130, S140, S150, or S160 can therefore apply to respective Blocks S110A, S120A, S130A, S140A, S150A, or S160A executed by the first node or respective Blocks S110B, S120B, S130B, S140B, S150B, or S160B executed by the second node.

Depending on the relative time bias between the two nodes, the first node can execute Blocks S110A, S120A, S130A, and S140A at any time relative to the second node executing Blocks S110B, S120B, S130B, and S140B (assuming both nodes are executing during the synchronization slot). However, the first node executes Blocks S150A and S160A to receive and calculate a TOA for a synchronization sent from the second node after the second node executes Blocks S110B, S120B, S130B, and S140B. Likewise, the second node executes Blocks S150B and S160B after the first node executes Blocks S110A, S120A, S130A, and S140A.

7.1 Transmission Times

In Blocks S110A and S110B each node in a pair of nodes transmits a synchronization signal at a predetermined or coordinated transmission time within a synchronization slot. In implementations wherein the nodes execute TDD, a first transmission time for Block S110A can be offset from a second transmission time for Block S110B by a transmission interval. Thus, each node in a pair of nodes transmits a synchronization signal at a predetermined transmission time according to each node's own clock. For example, if a first transmission time for a first node is set at 1:00:00, then the first node transmits the synchronization at 1:00:00 according to its own clock. Thus, from a third party perspective, each node transmits a synchronization signal offset by the time bias between the two nodes and offset by the transmission interval between the transmission times for each node.

Because each node transmits a synchronization signal at a predetermined transmission time, instead of transmitting a synchronization signal in response to receiving a signal from another node, such as is in typical two-way ranging protocols, the system executing the method S100 does not require precise characterization of receive chain delay, transmit chain delay, or intervening processing delay for each node in order to accurately calculate the time bias and propagation time between a pair of nodes.

7.2 Synchronization Protocol

Generally, each node generates a synchronization signal; concurrently or consecutively transmits the synchronization signal to the other node in a pair of nodes and receives a self-receive signal based on the transmitted synchronization signal; and receives a synchronization signal from the other node in the node pair. For ease of description, the nodes in a node pair will be referred to as $n_1$ and $n_2$. However, $n_1$ and $n_2$ can refer to any two-node pair in a mesh network (e.g., $n_i$ and $n_j$). The method S100 includes calculating the relative time bias between $n_1$ and $n_2$ represented as $(b_1-b_2)$ and the propagation delay $\tau$. Based on the reciprocity theorem of electromagnetism, the propagation delay for a signal transmitted from $n_1$ to $n_2$ is equal to the propagation delay for a signal transmitted from $n_2$ to $n_1$ ($\tau_{1,2}=\tau_{2,1}\equiv\tau$).

In calculating TOA such as in Blocks S140 and S160 the node can cross-correlate a received synchronization signal or self-receive signal with a template signal to determine a timestamp corresponding to the peak value of the autocorrelation function. Synchronization signals can include specifically chosen sequences that have a high autocorrelation value when the sequences are aligned and a low autocorrelation value otherwise. In one implementation, each node performs digital autocorrelation between received signals and template signals. Alternatively, each node performs analog autocorrelation between an analog conversion of the digital synchronization signal and the template signal. The latter accounts for the value of the samples in addition to the time durations between samples. Furthermore, the node can refine the calculated TOA based on phase information extracted from the synchronization signal. In one implementation, the nodes can transmit each synchronization signal over multiple frequency bands to increase the number of carrier phase measurements obtained by the receiving node and therefore increase the accuracy of the TOA calculation.

In Block S110A, at local time $T_1$ (i.e. a first transmission time), $n_1$ generates a digital synchronization signal at the FPGA or DSP. In one implementation, $n_1$ converts the digital synchronization signal to an analog synchronization signal for transmission via the antenna and propagates the converted synchronization signal along the transmit chain of $n_1$, thereby incurring a transmit chain delay, $t_1$. The analog signal then interacts with the self-receive hardware, which reflects or otherwise back-couples the synchronization signal into the Rx port of $n_1$ as shown in Block S120A. The self-receive signal (i.e. reflected or otherwise back-coupled) synchronization signal is substantially similar to the synchronization signal though the power of the two signals may differ. In one implementation, the power of the self-receive signal ensures the self-receive signal does not saturate the ADC of $n_1$.

In Block S130A, $n_1$ receives the self-receive signal as it is transmitting the synchronization signal. While the self-receive signal propagates through the receive chain of $n_1$ it incurs receive chain delay, $r_1$. In Block S140A, $n_1$ calculates a local TOA of its self-receive signal, $S_{1,1}$, which is related to the unknown parameters of interest via the following equation:

$$S_{1,1} = T_1 + t_1 + r_1.$$

Thus, $S_{1,1}$ represents the TOA of the self-receive signal from $n_1$ according to the clock of $n_1$.

As shown in FIG. 5A, and in Blocks S110B, S120B, S130B, and S140B, $n_2$ executes the equivalent steps to those executed by $n_1$ in Blocks S110A, S120A, S130A, and S140A, thereby transmitting a second synchronization signal and calculating a TOA of the self-receive signal generated by $n_2$:

$$S_{2,2} = T_2 + t_2 + r_2,$$

where $T_2$ is a local time at $n_2$ (i.e. the second transmission time), $t_2$ is that transmit chain delay of $n_2$, and $r_2$ is the receive chain delay of $n_2$. In implementations wherein the transmission times for each of the nodes is offset a transmission interval, $\Delta$, $T_2=T_1+\Delta$ Thus, $S_{2,2}$ represents the measured TOA of the self-receive signal from $n_2$ according to the clock of $n_2$.

As shown in FIG. 5B, and in Block S150A, $n_1$ receives the synchronization signal from $n_2$, which propagates through the receive chain of $n_1$ incurring receive chain delay, $r_1$. In Block S160A, $n_1$ then calculates a local TOA for the synchronization signal received from $n_2$, $S_{1,2}$, which is expressed in the following equation:

$$S_{1,2} = T_2 - b_2 + r_2 + \tau + r_1 + b_1.$$

Thus, $S_{1,2}$ represents the measured TOA of the synchronization signal from $n_2$ according to the clock of $n_1$.

In Blocks S150B and S160B, $n_2$ executes the equivalent steps to those executed by $n_1$ in Blocks S150A and S160A, thereby receiving a synchronization signal from $n_1$ and calculating a local TOA (at $n_2$) for the synchronization signal, $S_{2,1}$, expressed as follows:

$$S_{2,1} = T_1 - b_1 + t_1 + \tau + r_2 + b_2.$$

Thus, $S_{2,1}$ represents the measured TOA of the synchronization signal from $n_1$ according to the clock of $n_2$.

In Block S170, one of the nodes (e.g., a master node in the pair of nodes), either $n_1$ or $n_2$, or another computational device such as a remote server or a separate master node, collects the above TOAs, $S_{1,1}$, $S_{1,2}$, $S_{2,2}$, and $S_{2,1}$, to calculate $\tau$ and $b_1-b_2+r_1-r_2$, or the relative time bias plus the difference in receiver chain delay. Taking differences between the self-receive signal and the corresponding synchronization signal received at opposite nodes the following is derived:

$$S_{1,2} - S_{2,2} = \tau + r_1 + b_1 - r_2 - b_2,$$

$$S_{2,1} - S_{1,1} = \tau + r_2 + b_2 - r_1 - b_1.$$

Thus $\tau$ is calculated as:

$$\tau = \frac{1}{2}[(S_{1,2} - S_{2,2}) + (S_{2,1} - S_{1,1})]$$

and $b_1-b_2+r_1-r_2$ is calculated as:

$$b_1 - b_2 + r_1 - r_2 = \frac{1}{2}[(S_{1,2} - S_{2,2}) - (S_{2,1} - S_{1,1})].$$

Although a value for the pure relative time bias, $b_1-b_2$, cannot be calculated without the value of $r_1-r_2$, adjusting the clock of one node in the pair of nodes by $b_1-b_2+r_1-r_2$ ensures that any signal received by both nodes at the same time will receive the same timestamp at each node even if the instantaneous time at each clock differs by $r_1-r_2$ because the difference in receive chain delay will compensate for the post inaccuracy in the time bias. Alternatively, if $r_1-r_2 \cong 0$, then:

$$b_1 - b_2 \cong \frac{1}{2}[(S_{1,2} - S_{2,2}) - (S_{2,1} - S_{1,1})].$$

Once $\tau$ and $b_1-b_2+r_1-r_2$ have been calculated, the method S100 can also include synchronizing the time between $n_1$ and $n_2$ by adding $b_1-b_2+r_1-r_2$ to the clock of $n_1$ or $n_2$ to compensate for the initial time bias. In implementations with multiple nodes in the mesh network, one node is designated as a "master node" while the other nodes are designated "slave nodes." Thus, in this implementation, the method S100 includes adjusting the clocks of the slave nodes to match the master node. Alternatively, a master node or remote server in the system can track the relative time bias of each node pair in a mesh network and compensate for the calculated time biases when executing processes that rely on precise time synchronization between nodes in the mesh network, such as time-based communication protocols or multilateration of other RF devices.

In one implementation, each node in the mesh network can average measurements to calculate a time bias and propagation delay when these variables are over-defined. For example, in a network including nodes $n_1$, $n_2$, and $n_3$, the time bias between $n_1$ and $n_2$ can also be calculated as follows:

$$b_1 - b_2 \cong \frac{1}{2}[(S_{1,3} - S_{3,3}) - (S_{3,1} - S_{1,1})] - \frac{1}{2}[(S_{2,3} - S_{3,3}) - (S_{3,2} - S_{2,2})].$$

Additionally, the method S100 can include indirectly calculating a time bias between nodes that do not have a direct communication line (e.g., due to an obstruction of communication between the two nodes). For example, in a network including nodes $n_1$, $n_2$, and $n_3$, the time bias between $n_1$ and $n_3$ can also be calculated as follows:

$$b_1 - b_3 \cong \frac{1}{2}[(S_{1,2} - S_{2,2}) - (S_{2,1} - S_{1,1})] + \frac{1}{2}[(S_{2,3} - S_{3,3}) - (S_{3,2} - S_{22})].$$

Thus, $n_2$ and $n_3$ can execute another iteration of the method S100 and the system can calculate a time bias between the first clock of $n_1$ and the third clock of $n_3$ based on a sum of the first time bias ($b_1-b_2$) and the second time bias ($b_2-b_3$).

Furthermore, the method S100 can include calculating an instantaneous uncertainty in the relative time bias between nodes, $\delta(b_1-b_2)$ and an instantaneous uncertainty in the propagation delay $\delta\tau$. Sources of uncertainty can include the propagated uncertainty based on the peak width of the autocorrelation function for each TOA calculation plus any expected phase noise that may occur at the clocks of each node between synchronization slots.

8. Phase Refinement

In addition to calculating the time bias and propagation time between nodes based on the synchronization protocol described above, the system can also refine the propagation time $\tau$ by extracting carrier phase information from each of the four received signals, the first self-receive signal received at $n_1$, the first synchronization signal received at $n_2$, the second self-receive signal received at $n_2$, and the second synchronization signal received at $n_1$. Upon receiving the first self-receive signal $n_1$ detects a carrier phase of the first self-receive signal, which is represented as follows:

$$L_{1,1} = (2\pi f_c T_1 + \phi_{1,Rx}) \bmod 2\pi,$$

where $f_c$ is the carrier frequency and $\phi_{1,Rx}$ is the phase delay induced by the receive chain of $n_1$. Likewise, $n_2$ detects a carrier phase of the second self-receive signal, which is represented as follows:

$$L_{2,2} = (2\pi f_c T_2 + \phi_{2,Rx}) \bmod 2\pi,$$

where $f_c$ is the carrier frequency and $\phi_{1,Rx}$ is the phase delay induced by the receive chain of $n_1$. Additionally, $n_1$ can detect the carrier phase of the synchronization signal received from $n_2$, which is represented as follows:

$$L_{1,2} = (2\pi f_c(T_2 + \tau) + \phi_{1,Rx}) \bmod 2\pi.$$

Likewise, $n_2$ can detect the carrier phase of the synchronization signal received form $n_1$, which is represented as follows:

$$L_{2,1} = (2\pi f_c(T_1 + \tau) + \phi_{2,Rx}) \bmod 2\pi.$$

To refine the calculation of $\tau$, the above relations can be rearranged as follows:

$$L_{2,1} - L_{1,1} = (2\pi f_c(T_1 + \tau) + \phi_{2,Rx} - 2\pi f_c T_1 - \phi_{1,Rx}) \bmod 2\pi$$
$$= (\phi_{2,Rx} + 2\pi f_c \tau - \phi_{1,Rx}) \bmod 2\pi,$$

$$L_{1,2} - L_{2,2} = (2\pi f_c(T_2 + \tau) + \phi_{1,Rx} + 2\pi f_c T_2 - \phi_{2,Rx}) \bmod 2\pi$$
$$= (\phi_{1,Rx} + 2\pi f_c \tau - \phi_{2,Rx}) \bmod 2\pi.$$

Thus, the system can refine the value of $\tau$, based on the synchronization protocol described above by calculating:

$$(L_{2,1} - L_{1,1}) + (L_{1,2} - L_{2,2}) = (4\pi f_c \tau) \bmod 2\pi,$$

$$\tau \in \left\{ \frac{(L_{2,1} - L_{1,1}) + (L_{1,2} - L_{2,2}) + n 2\pi}{4\pi f_c} : n \in \mathbb{Z} \right\}.$$

Once several measurements are obtained for a range of carrier frequencies, $f_c$, the system can statistically solve the set of equations (e.g., via a least squares calculation or other numerical methods) to refine the propagation time $\tau$.

Thus, in one implementation, a remote server or master node executing Blocks of the method S100 can, after transmission of the synchronization signal by $n_1$ at $T_1$ according to a clock of $n_1$: receive, from $n_1$, a phase of a first self-receive signal according to $n_1$; and receive, from $n_2$, a phase of the synchronization signal from $n_1$ according to $n_2$; and, after transmission of the synchronization signal by $n_2$ at $T_2$ according to a clock of $n_2$: receive, from $n_2$, a phase of a second self-receive signal according to the clock of $n_2$; and receive, from $n_1$, a phase of the synchronization signal from $n_2$ according to the clock of $n_1$. The remote server or master node can then refine the first propagation delay based on the phase of the first self-receive signal, the phase of the first synchronization signal, the phase of the second self-receive signal, and the phase of the second synchronization signal.

9. Clock Adjustment

Figure 2:
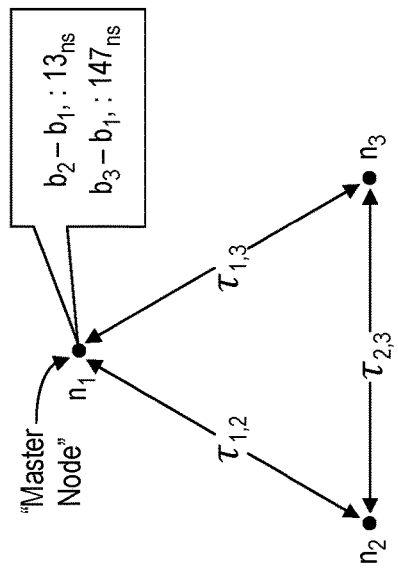
FIG. 2 is a schematic representation of a mesh network.

Once the system has executed the synchronization protocol and/or phase refinement for a pair of nodes, the system can shift the clock of one node in each pair of nodes by the calculated time bias in order to synchronize the clocks of the pair of nodes. Alternatively, as shown in FIG. 2 the system can maintain the time bias of each node relative to a master node or other time standard (e.g., the clock of a remote server) and correct scheduling times sent to each node and/or timestamps received from each node based on the latest calculated time bias of the node relative to the master node or time standard—such as by subtracting the time bias of the node from any timestamps calculated by the node. Furthermore, the system can predict a current time bias for each node based on the most recently calculated time bias and the predictive drift model for the node (further described below).

10. Synchronization Slot Refinement

In Block S180, the method S100 includes calculating a duration of a subsequent synchronization slot between previously synchronized nodes. Once a pair of nodes have executed the method S100, their clocks may be aligned to within one to ten nanoseconds. Thus, the synchronization slot can be made successively smaller as the synchronization between the two nodes improves.

The method S100 can also include calculating durations of subsequent synchronization slots based on a combination (e.g., a uncertainty propagated sum) of: the time bias uncertainty; the expected drift in the relative time bias between synchronization slots (calculated via the predictive drift model further described below); the propagation delay; the propagation delay uncertainty; the greater of the transmit chain delay of the first node or the transmit chain delay of the second node; the greater of the receive chain delay of the first node or the receive chain delay of the second node; the duration of the synchronization signal, and/or the expected change in the propagation delay due to relative movement between the pair of nodes.

In one implementation, the synchronization slot is additionally lengthened by a time buffer to ensure that each node receives a complete synchronization signal within the synchronization slot. When the synchronization slot duration is set equal to the above sum, the synchronization slot duration is long enough to allow a synchronization signal generated at one node to be fully received at the second node in a case where there is greater than expected drift or error in any of the aforementioned quantities.

In one example, receive chain delay and transmit chain delay may be negligible when compared to the synchronization signal duration. Therefore, the method S100 can include adding a time buffer of a duration approximating a maximum sum of a typical receive chain delay and a typical transmit chain delay to calculate a synchronization slot duration.

In one implementation, following a failure to synchronize caused by, for example, a greater than expected drift in the time bias between nodes or large increase in propagation delay, the method S100 can include inserting a synchronization slot in a subsequent TDMA frame and increasing the synchronization slot duration to provide more time to send and receive synchronization signals. The method S100 can increase the synchronization slot duration incrementally (e.g. in increments of ten microseconds) until the synchronization process is received or the method S100 can include extending the synchronization slot duration to a significantly longer duration to increase the likelihood of receiving a signal.

Thus, a remote server or master node executing Blocks of the method S100 can decrease the synchronization slot duration for a subsequent synchronization slot corresponding to a pair of nodes such that the updated synchronization slot duration is less than the initial synchronization slot duration but greater than a sum of a first uncertainty in the first time bias between the clocks of the pair of nodes and a synchronization signal duration. The remote server or master node can then schedule transmission times for each node in the pair of nodes within the updated synchronization slot duration.

Furthermore, the system can schedule the transmission times for synchronization signals in a pair of nodes based on a recently calculated time bias between the pair of nodes. Thus, the system can account for the relative time bias between nodes in order to ensure that both nodes are transmitting during the next synchronization slot despite the reduced duration of the synchronization slot.

11. Predictive Drift Model

In one variation of the method S100, the master node or remote server executing Block S170, can also execute a predictive drift model based on successive time bias and propagation delay characterization between nodes in the mesh network. Generally, the predictive drift model characterizes the drift of a node's clock (e.g. a crystal oscillator clock) relative to the clocks of other nodes in the network or relative to a time standard (e.g., UTC), as a function of environmental factors such as temperature, humidity, movement, and vibration. More specifically, the method S100 can include recording environmental data at each node and observing relative drift calculated over multiple prior synchronization slots to train a predictive drift model of the drift of particular nodes in the mesh network. The predictive drift model outputs the expected drift of one node in the mesh network relative to a master node or a time at a remote server based on the time elapsed since the most recent synchronization slot for the node and recent environmental data collected at the node.

The system can maintain predictive drift models characterizing the drift of each pair of nodes in a mesh network relative to each other. Alternatively, the master node and/or remote server can compress the pairwise predictive drift models and instead maintain a single predictive drift model for each node in the mesh network relative to the clock at a master node in the mesh network or a time standard accessed at a remote server.

In one implementation, the method S100 includes periodically adjusting a node's clock time between synchronization cycles according to the output of the predictive drift model (e.g. updating the node's clock value every millisecond according to the predicted drift at the node). Alternatively, the system can calculate an estimate for the relative time bias of a node between synchronization cycles based on the predictive drift model of the node.

Furthermore, the method S100 can include adjusting the duration of a subsequent synchronization slot according to the output of the predictive drift model. Furthermore, the method S100 can include triggering the inclusion of a synchronization slot in a TDMA frame in response to a predicted drift value being greater than a predefined drift threshold (e.g. triggering the inclusion of a synchronization slot in the TDMA frame when the predicted drift model predicts greater than one nanosecond of drift between the slave node clock and the master node clock).

The predictive drift model can be a combination of a set of physical models representing pertinent environmental parameters. In one implementation, the predictive drift model includes a temperature model for drift as a function of temperature and crystal cut. The temperature model can include a set of approximate models, each model relating drift (e.g. in parts-per-million) to temperature for a corresponding crystal cut. In one implementation, the method S100 can include classifying the crystal oscillator of each node according to observed temperature drift over multiple synchronization slots to select a polynomial approximation of temperature drift associated with a particular node as a function of time.

The predictive drift model can also include predictive models for thermal hysteresis, ambient pressure, humidity, electric and/or magnetic field strength, drive level for the crystal oscillator, and/or reference voltage for the crystal oscillator.

In one implementation, the predictive drift model can output a confidence interval for expected drift based on randomly distributed phase noise in a crystal oscillator and systematic drift. The predictive drift model can calculate a distribution of phase noise for the crystal oscillator based on factors such as reference source noise, power supply noise, vibration induced noise, and/or acceleration induced noise.

Thus, the system can execute successive iterations of the method S100 for a node in the mesh network and record a time series of relative time biases between the node and a reference time, which can be a time maintained at a master node or a remote server. Concurrently, the system can record a time series of environmental data from the node. The system can then correlate the time series of environmental data with the time series of time biases to predict the drift of the time bias of the node based on changes in the environmental data. In this manner, the system can calculate a temperature correlation between the temperature at a particular node and the drift rate exhibited by the node based on a time series of temperature data and a time series of time biases of the node. Additionally or alternatively, the system can calculate a movement correlation between the movement of a node (e.g., acceleration measured by an IMU at the node) and the drift rate exhibited by the node based on a time series of movement data and a time series of time biases of the node.

In yet another implementation, the system can detect the movement of a node by recording a time series of the propagation delays between one node in a mesh network and other nodes of the mesh network. Thus, the system can: calculate a first relative location of a node based on a first propagation delay calculated during a first iteration of the method S100; calculate a second relative location of a node based on a second propagation delay calculated during a second iteration of the method S100; and calculate a movement correlation of drift of the clock of the node based on the first relative location, the second relative location, the first time bias, and the second time bias In one implementation, the system can: calculate the time bias uncertainty for a recently calculated time bias of a first node relative to a second node; predict the drift magnitude of the time bias at the node based on a predictive drift model; predict a change in the propagation delay between the first node and the second node based on motion data from the first node and the second node; and set a synchronization slot duration equal to a sum of the time bias uncertainty plus the drift magnitude plus the propagation delay plus the change in the propagation delay. Therefore, the system can ensure reception of subsequent synchronization signals transmitted between a node pair by accounting for relative drift between a pair of nodes in the mesh network.

12. Resynchronization Triggers

One variation of the method S100 includes, triggering the inclusion of one or more synchronization slots within a subsequent TDMA frame based on the output of the predictive drift model or the detection of an environmental change. In one implementation, the method S100 includes triggering the inclusion of a synchronization slot upon the predictive drift model outputting a predicted drift magnitude greater than a threshold drift value (e.g. greater than ten nanoseconds of drift since the last synchronization slot). Alternatively, the method S100 can include triggering the inclusion of a synchronization slot based on observed temperature change (e.g. via a digital thermometer at the node) and/or acceleration or vibration data (e.g. via IMU data collected at the node). Furthermore, the method S100 can include triggering the inclusion of a synchronization slot based on movement of one node relative to another. The method S100 can include detecting movement via an IMU at the node, a measurement of the doppler shift for incoming signals from the node, or via multilateration between the nodes.

In one example, the system can: after an initial iteration of the method S100, measure a temperature at a first node in the node pair; calculate a time bias drift based on the temperature and a temperature drift model; and schedule a synchronization slot in the next TDMA frame based on the time bias drift.

Generally, when method S100 triggers the inclusion of a synchronization slot, the synchronization slot is included in the subsequent TDMA frame and indicated in the header of the TDMA frame.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A transceiver comprising:
a transmit chain;
a receive chain;
self-receive hardware coupling the transmit chain to the receive chain;
a first clock; and
a processor configured to:
generate a first synchronization signal via the transmit chain;
sample a first self-receive signal via self-receive hardware and the receive chain;
calculate a time-of-arrival of the first self-receive signal based on the first clock;
sample a second synchronization signal via the receive chain, the second synchronization signal transmitted by a second transceiver;
calculate a time-of-arrival of the second synchronization signal based on the first clock; and
calculate a time bias between the first clock and a second clock of the second transceiver based on the time-of-arrival of the first self-receive signal and the time-of-arrival of the second synchronization signal.

2. The transceiver of claim 1, wherein the processor is further configured to calculate a propagation delay between the transceiver and the second transceiver based on the time-of-arrival of the first self-receive signal and the time-of-arrival of the second synchronization signal.

3. The transceiver of claim 1, wherein the processor is further configured to:
receive a time-of-arrival of the first synchronization signal at the second transceiver, the time-of-arrival of the first synchronization signal calculated based on the second clock of the second transceiver;
receive a time-of-arrival of a second self-receive signal at the second transceiver, the time-of-arrival of the second self-receive signal calculated based on the second clock of the second transceiver; and
calculate the time bias between the first clock and the second clock based on the time-of-arrival of the first self-receive signal, the time-of-arrival of the first synchronization signal, the time-of-arrival of the second self-receive signal, and the time-of-arrival of the second synchronization signal.

4. The transceiver of claim 3, wherein the processor is further configured to calculate the time bias between the first clock and the second clock by solving for $b_1 - b_2$ in:

$$b_1 - b_2 = \frac{1}{2}[(S_{1,2} - S_{2,2}) - (S_{2,1} - S_{1,1})]$$

wherein $S_{1,1}$ represents the time-of-arrival of the first self-receive signal, $S_{1,2}$ represents the time-of-arrival of the second synchronization signal, $S_{2,1}$ represents the time-of-arrival of the first synchronization signal, and $S_{2,2}$ represents the time-of-arrival of the second self-receive signal.

5. The transceiver of claim 1, wherein the self-receive hardware comprises:
an antenna;
a transmission line device coupled to the transmit chain and the receive chain; and
an impedance matching network coupled between the transmission line device and the antenna configured to transform an impedance of the antenna to define a reflection coefficient at an antenna interface of the antenna effective to back-couple a reflected signal based on a transmitted signal from the transmit chain to the receive chain.

6. The transceiver of claim 5:
wherein the receive chain comprises an analog-to-digital converter; and
wherein the self-receive hardware comprises:
the antenna;
the transmission line device; and
the impedance matching network further configured to define the tuned reflection coefficient at the antenna interface of the antenna effective to generate the reflected signal from the transmit chain to the receive chain, the reflected signal characterized by a signal power within an operating dynamic range of the analog-to-digital converter.

7. The transceiver of claim 5, wherein the impedance matching network comprises a switchable matching network configured to adjust the tuned reflection coefficient based on a transmit frequency of the transmitted signal.

8. The transceiver of claim 1, wherein the processor comprises a digital signal processor.

9. The transceiver of claim 1, wherein the processor comprises a field programmable gate array.

10. A transceiver comprising:
a transmit chain;
a receive chain;
self-receive hardware coupling the transmit chain to the receive chain;
a first clock; and
a processor configured to:
generate a first synchronization signal via the transmit chain;
sample a first self-receive signal via self-receive hardware and the receive chain;
calculate a time-of-arrival of the self-receive signal based on the first clock;
sample a second synchronization signal via the receive chain, the second synchronization signal transmitted by a second transceiver;
calculate a time-of-arrival of the second synchronization signal based on the first clock; and
calculate a propagation delay between the transceiver and the second transceiver based on the time-of-arrival of the self-receive signal and the time-of-arrival of the second synchronization signal.

11. The transceiver of claim 10, wherein the processor is further configured to calculate a time bias between the first clock and a second clock of the second transceiver based on the time-of-arrival of the first self-receive signal and the time-of-arrival of the second synchronization signal.

12. The transceiver of claim 10, wherein the processor is further configured to:
receive a time-of-arrival of the first synchronization signal at the second transceiver, the time-of-arrival of the first synchronization signal calculated based on a second clock of the second transceiver;
receive a time-of-arrival of a second self-receive signal at the second transceiver, the time-of-arrival of the second self-receive signal calculated based on the second clock of the second transceiver; and
calculate the propagation delay between the transceiver and the second transceiver based on the time-of-arrival of the first self-receive signal, the time-of-arrival of the first synchronization signal, the time-of-arrival of the second self-receive signal, and the time-of-arrival of the second synchronization signal.

13. The transceiver of claim 12, wherein the processor is further configured to calculate the propagation delay by solving for t in:

$$\tau = \frac{1}{2}[(S_{1,2} - S_{2,2}) + (S_{2,1} - S_{1,1})];$$

and
wherein $S_{1,1}$ represents the time-of-arrival of the first self-receive signal, $S_{1,2}$ represents the time-of-arrival of the second synchronization signal, $S_{2,1}$ represents the time-of-arrival of the first synchronization signal, and $S_{2,2}$ represents the time-of-arrival of the second self-receive signal.

14. A transceiver comprising:
a transmit chain;
a receive chain;
self-receive hardware coupling the transmit chain to the receive chain;
a first clock; and
a processor configured to:
generate a first synchronization signal via the transmit chain;
sample a first self-receive signal via self-receive hardware and the receive chain;
calculate a phase of the self-receive signal based on the first clock;
sample a second synchronization signal via the receive chain, the second synchronization signal transmitted by a second transceiver;
calculate a phase of the second synchronization signal based on the first clock; and
calculate a time bias between the first clock and a second clock of the second transceiver based on the phase of the self-receive signal and the phase of the second synchronization signal.

15. The transceiver of claim 14, wherein the processor is further configured to calculate a propagation delay between the transceiver and the second transceiver based on the phase of the first self-receive signal and the phase of the second synchronization signal.

16. The transceiver of claim 15, wherein the processor is further configured to refine the time bias as an element of:

$$\frac{(\angle_{2,1} - \angle_{1,1}) + (\angle_{1,2} - \angle_{2,2}) + n2\pi}{4\pi f_c} : n \in \mathbb{Z},$$

wherein $\angle_{1,1}$ represents the phase of the first self-receive signal, $\angle_{2,1}$ represents the phase of the first synchronization signal, $\angle_{2,2}$ represents the phase of the second self-receive signal, and $\angle_{1,2}$ represents the phase of the second synchronization signal.

17. The transceiver of claim 14, wherein the processor is further configured to:

receive a phase of the first synchronization signal at the second transceiver, the phase of the first synchronization signal calculated based on the second clock of the second transceiver;

receive a phase of a second self-receive signal at the second transceiver, the phase of the second self-receive signal calculated based on the second clock of the second transceiver; and calculate the time bias between the first clock and the second clock based on the phase of the first self-receive signal, the phase of the first synchronization signal, the phase of the second self-receive signal, and the phase of the second synchronization signal.

18. The transceiver of claim 14, wherein the self-receive hardware comprises:
    an antenna;
    a transmission line device coupled to the transmit chain and the receive chain; and
    an impedance matching network coupled between the transmission line device and the antenna configured to transform an impedance of the antenna to define a tuned reflection coefficient at an antenna interface of the antenna effective to back-couple a reflected signal based on a transmitted signal from the transmit chain to the receive chain.

19. The transceiver of claim 18:
    wherein the receive chain comprises an analog-to-digital converter; and
    wherein the self-receive hardware comprises:
        the antenna;
        the transmission line device; and
        the impedance matching network further configured to define the tuned reflection coefficient at the antenna interface of the antenna effective to generate the reflected signal from the transmit chain to the receive chain, the reflected signal characterized by a signal power greater than a noise floor of the analog-to-digital converter and less than below a saturation voltage of the analog-to-digital converter.

20. The transceiver of claim 18, wherein the impedance matching network comprises a switchable wideband matching network configured to adjust the tuned reflection coefficient based on a transmit frequency of the transmitted signal.

* * * * *